(12) United States Patent
Lee et al.

(10) Patent No.: US 12,330,143 B2
(45) Date of Patent: Jun. 17, 2025

(54) SUPPORT-NANOPARTICLE COMPOSITE, CATALYST CONTAINING SAME, AND FABRICATION METHOD THEREFOR

(71) Applicant: LG CHEM, LTD., Seoul (KR)

(72) Inventors: Wonkyun Lee, Daejeon (KR); Sang Hoon Kim, Daejeon (KR); Gyo Hyun Hwang, Daejeon (KR); Jun Yeon Cho, Daejeon (KR); Kwanghyun Kim, Daejeon (KR); Ran Choi, Daejeon (KR)

(73) Assignee: LG CHEM, LTD., Seoul (KR)

(*) Notice: Subject to any disclaimer, the term of this patent is extended or adjusted under 35 U.S.C. 154(b) by 595 days.

(21) Appl. No.: 16/631,097

(22) PCT Filed: Sep. 11, 2018

(86) PCT No.: PCT/KR2018/010615
§ 371 (c)(1),
(2) Date: Jan. 14, 2020

(87) PCT Pub. No.: WO2019/054722
PCT Pub. Date: Mar. 21, 2019

(65) Prior Publication Data
US 2020/0164352 A1    May 28, 2020

(30) Foreign Application Priority Data

Sep. 12, 2017  (KR) .................. 10-2017-0116264
Jul. 10, 2018   (KR) .................. 10-2018-0079687

(51) Int. Cl.
*B01J 31/06*   (2006.01)
*B01J 21/18*   (2006.01)
(Continued)

(52) U.S. Cl.
CPC ............... *B01J 31/06* (2013.01); *B01J 21/18* (2013.01); *B01J 37/0221* (2013.01); *B01J 37/08* (2013.01);
(Continued)

(58) Field of Classification Search
None
See application file for complete search history.

(56) References Cited

U.S. PATENT DOCUMENTS 5,171,644 A    12/1992    Tsou et al.
5,314,760 A     5/1994    Tsou et al.
(Continued)

FOREIGN PATENT DOCUMENTS

CN    102473926 A    5/2012
CN    104707603 A    6/2015
(Continued)

OTHER PUBLICATIONS

Teranishi et al., Size control of monodispersed Pt nanoparticles and their 2D organization by electrophoretic deposition, J. Phys. Chem. B 1999, 103, 3818-3827 (Year: 1999).*
(Continued)

Primary Examiner — Coris Fung
Assistant Examiner — Keling Zhang
(74) Attorney, Agent, or Firm — Birch, Stewart, Kolasch & Birch, LLP

(57) ABSTRACT

A carrier-nanoparticle complex including: a carbon carrier; a polymer layer provided on a surface of the carbon carrier; and metal nanoparticles provided on the polymer layer, a catalyst including the same, an electrochemical cell or a fuel cell including the catalyst, and a method for preparing the same.

7 Claims, 11 Drawing Sheets

(51) Int. Cl.
*B01J 37/02* (2006.01)
*B01J 37/08* (2006.01)
*B82Y 30/00* (2011.01)
*C25B 11/057* (2021.01)
*C25B 11/073* (2021.01)
*H01M 4/66* (2006.01)
*B82Y 40/00* (2011.01)

(52) U.S. Cl.
CPC ............ *B82Y 30/00* (2013.01); *C25B 11/057* (2021.01); *C25B 11/073* (2021.01); *H01M 4/663* (2013.01); *B82Y 40/00* (2013.01); *H01M 4/667* (2013.01)

(56) References Cited

U.S. PATENT DOCUMENTS

| | | | |
|---|---|---|---|
| 5,659,457 A * | 8/1997 | Lian | H01G 11/32 361/528 |
| 2005/0014635 A1 | 1/2005 | Zhou et al. | |
| 2008/0233466 A1 | 9/2008 | Yuasa et al. | |
| 2011/0229766 A1 | 9/2011 | Ozaki et al. | |
| 2013/0288155 A1 | 10/2013 | Kim et al. | |
| 2014/0349843 A1 | 11/2014 | Patterson et al. | |
| 2018/0375108 A1 | 12/2018 | Cho et al. | |

FOREIGN PATENT DOCUMENTS

| | | |
|---|---|---|
| JP | WO2006/083029 A1 | 6/2008 |
| JP | 2011-228014 A | 11/2011 |
| JP | WO2010/064556 A1 | 5/2012 |
| KR | 10-2011-0132893 A | 12/2011 |
| KR | 10-1168203 B1 | 7/2012 |
| KR | 10-2013-0122507 A | 11/2013 |
| KR | 10-1629083 B1 | 6/2016 |
| KR | 10-2017-0092125 A | 8/2017 |
| WO | WO 2004/027904 A1 | 4/2004 |

OTHER PUBLICATIONS

Xu et al., Effect of particle size on the activity and durability of the Pt/C electrocatalyst for proton exchange membrane fuel cells, Applied Catalysis B: Environmental, 2012, 111-112, 264-27 (Year: 2012).*

Zhang et al., The effect of acid treatment on thermally exfoliated graphite oxide as electrode for supercapacitors, Electrochimica Acta, 2014, 138, 311-317 (Year: 2014).*

Coleman et al., Defect formation in graphene nanosheets by acid treatment: an x-ray absorption spectroscopy and density functional theory study, J. Phys. D: Appl. Phys., 2008, 41 (Year: 2008).*

Kopac et al., Temperature and alkaline hydroxide treatment effects on hydrogen sorption characteristics of multi-walled carbon nanotube-graphite mixture, Journal of Industrial and Engineering Chemistry, 2009, 15, 730-735 (Year: 2009).*

International Search Report (PCT/ISA/210) issued in PCT/KR2018/010615, mailed on Dec. 19, 2018.

Liu et al., "High performance Pd/C catalyst in solid polymer electrolyte water electrolysis and optimal using conditions," Department of Electrical Engineering, Henan Mechanical and Electrical Engineering College, Jun. 30, 2016, 1 page total.

Wang et al., "Selective electro-oxidation of glycerol over Au supported on extended poly(4-vinylpyridine) functionalized graphene," Applied Catalysis B: Environmental, vol. 166-167, 2015, pp. 25-31, 7 pages total.

Xu et al., "Effect on Pd/C catalyst electrocatalytic performance by alkali-treatment of the supported," Department of Chemical Engineering of Harbin Institute of Petroleum, Sep. 30, 2014, 1 page total.

* cited by examiner

[FIG. 1]
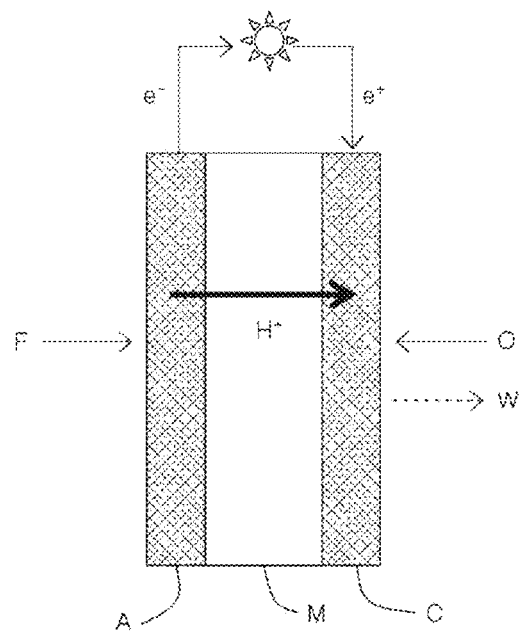
[FIG. 2]
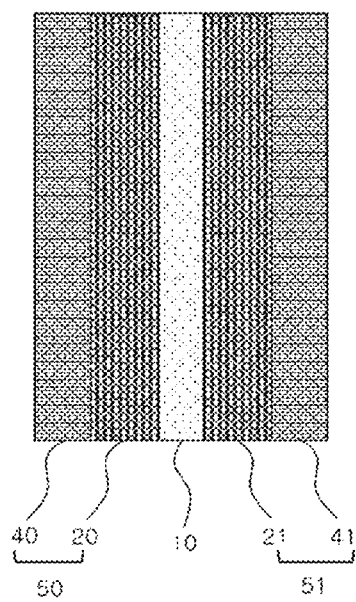

[FIG. 3]
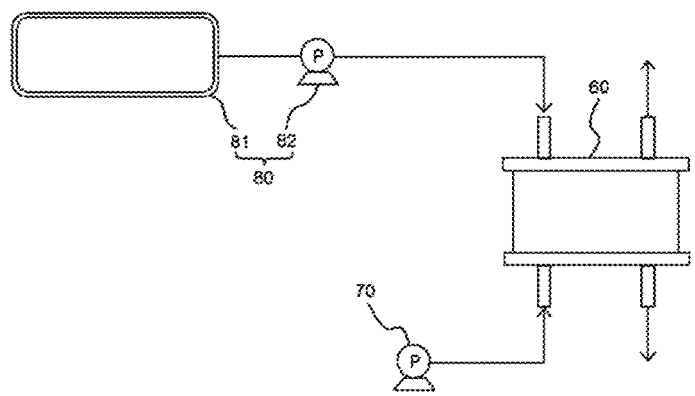
[Figure 4]
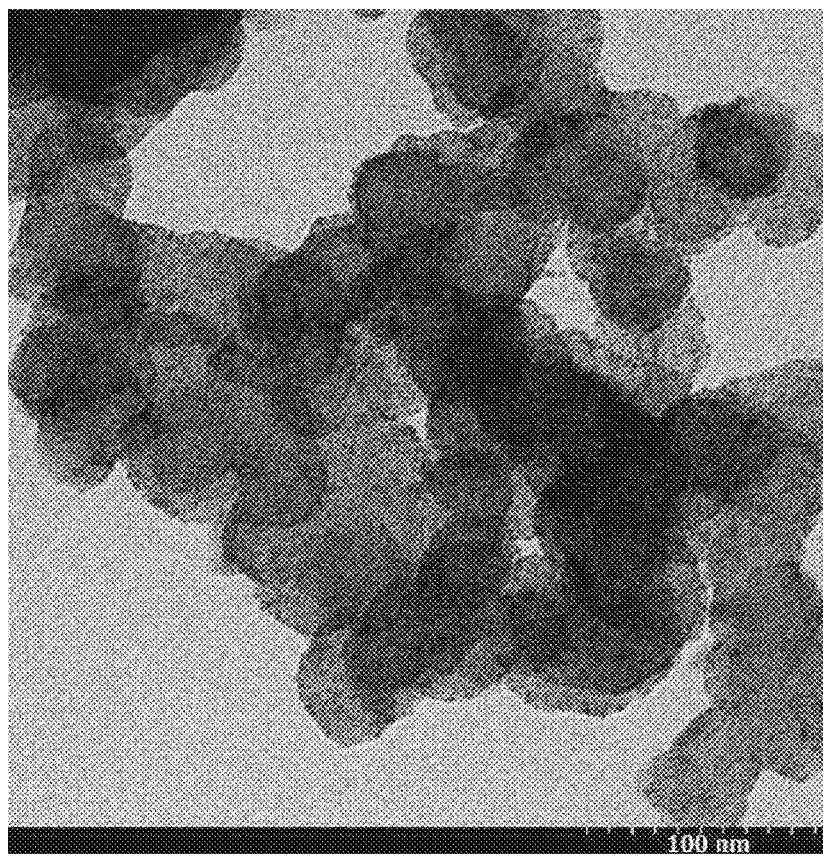

[Figure 5]
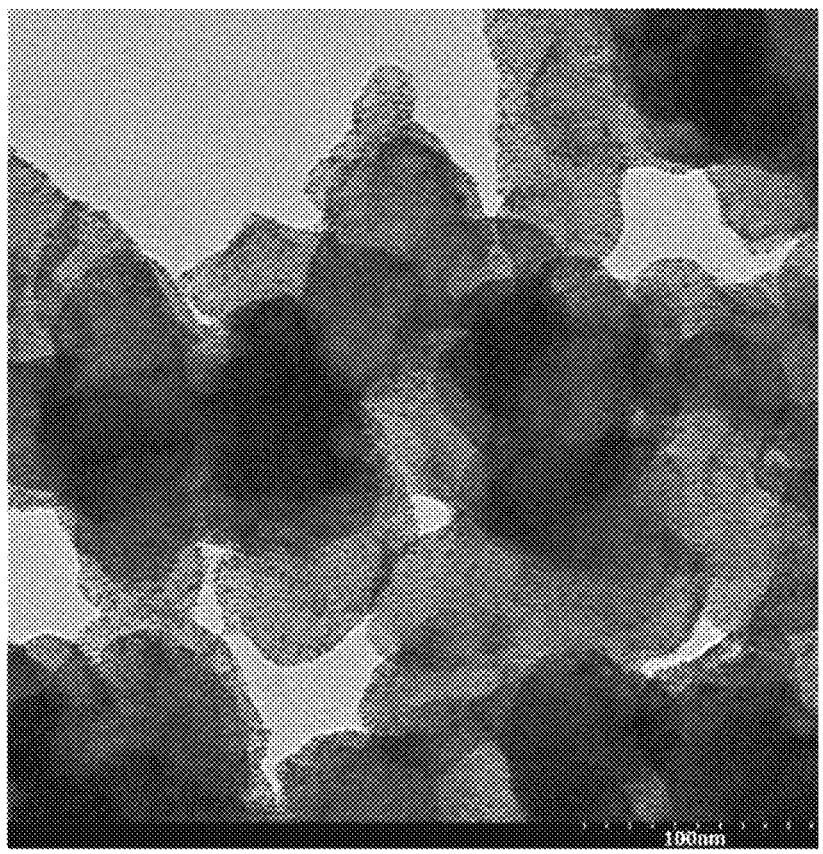

[Figure 6]
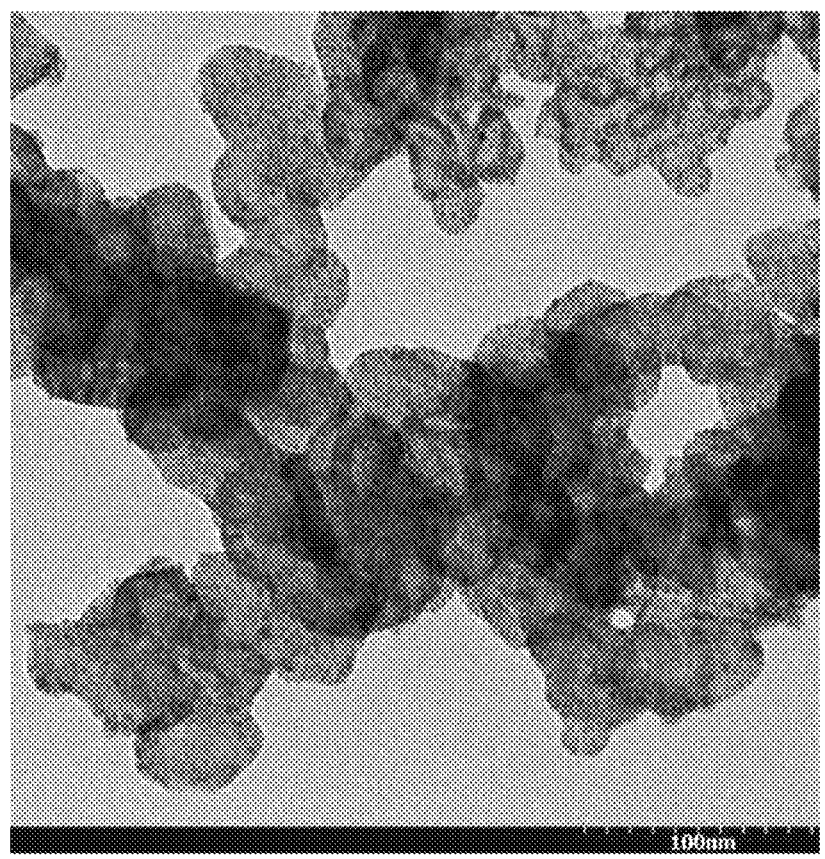

[Figure 7]
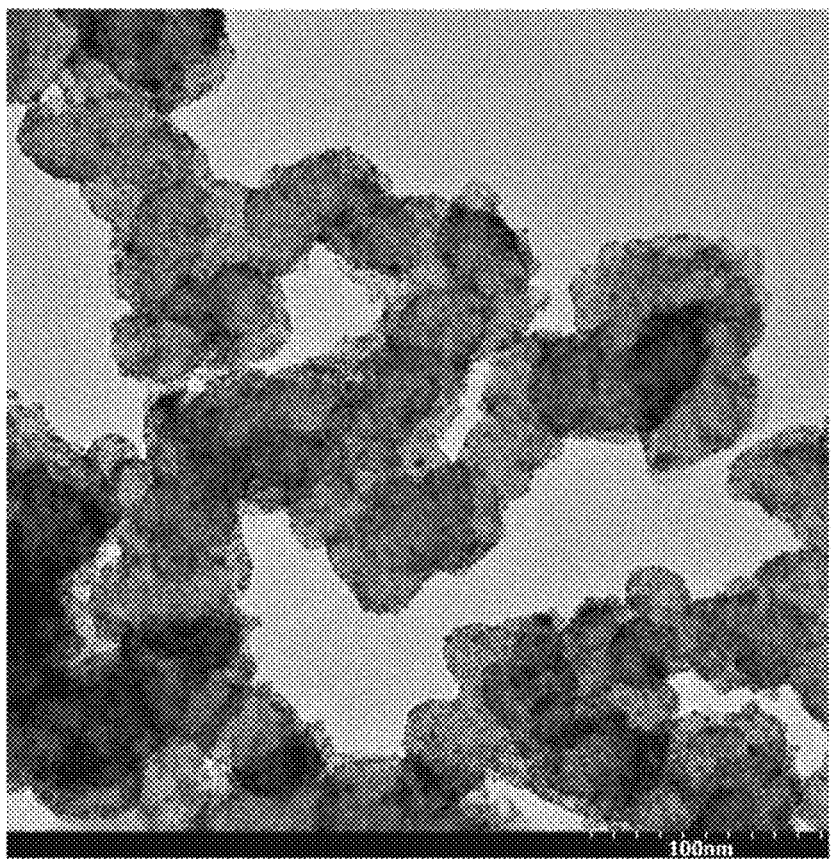

[Figure 8]
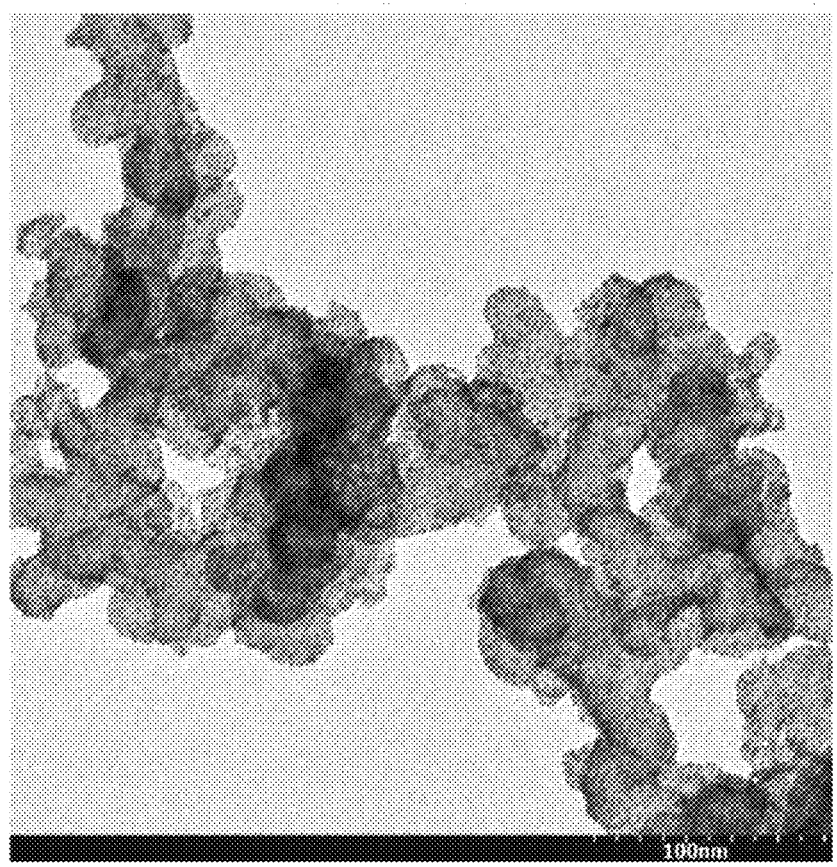

[Figure 9]
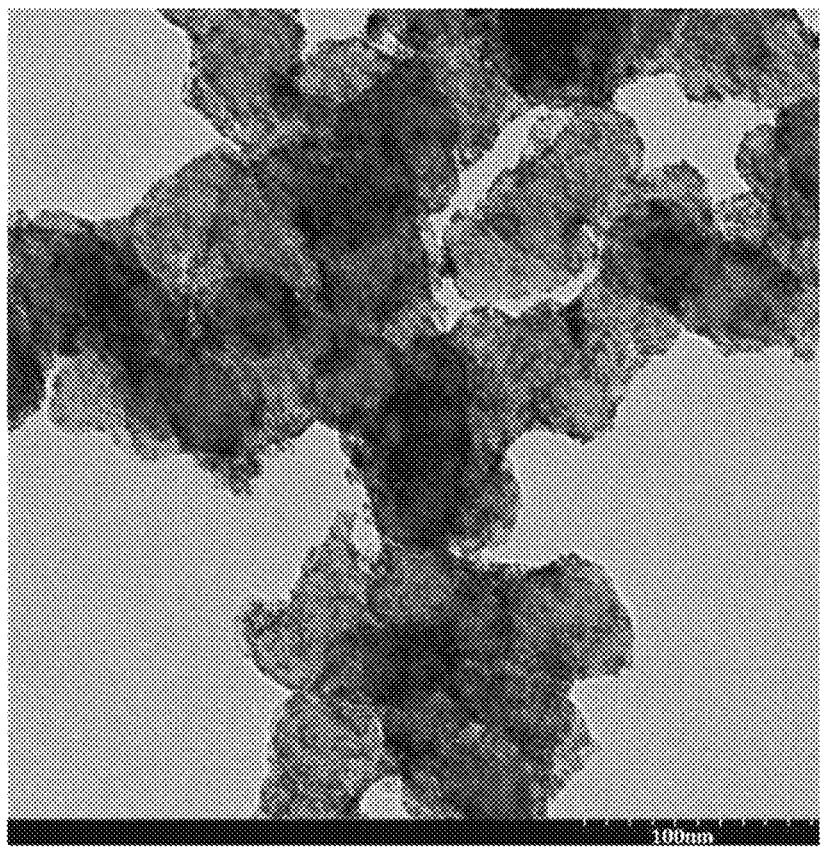

[Figure 10]
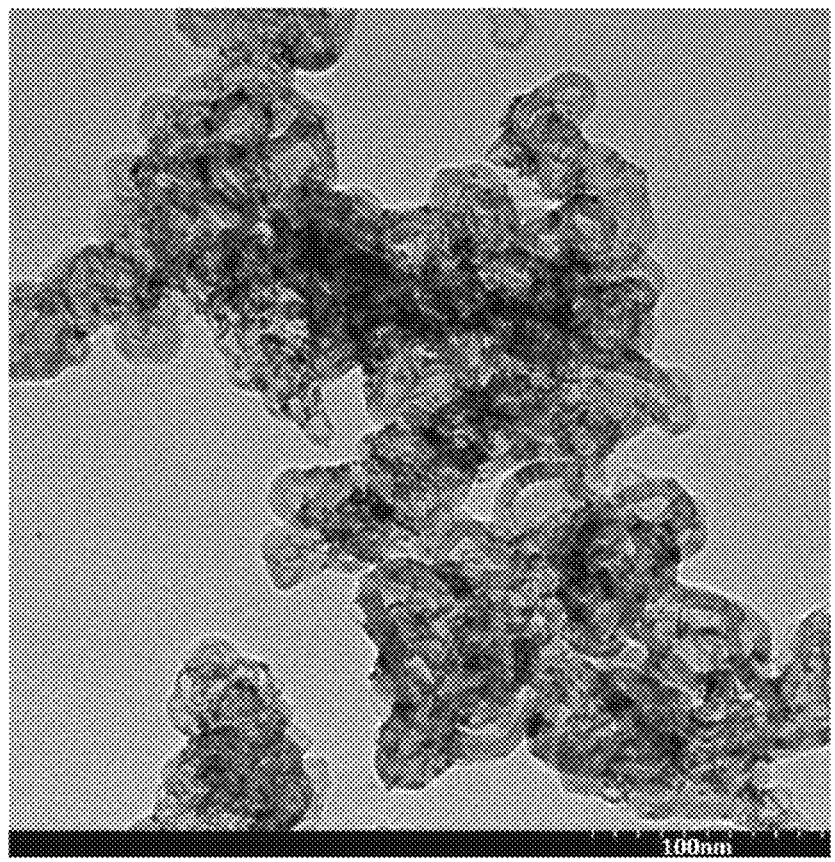

[Figure 11]
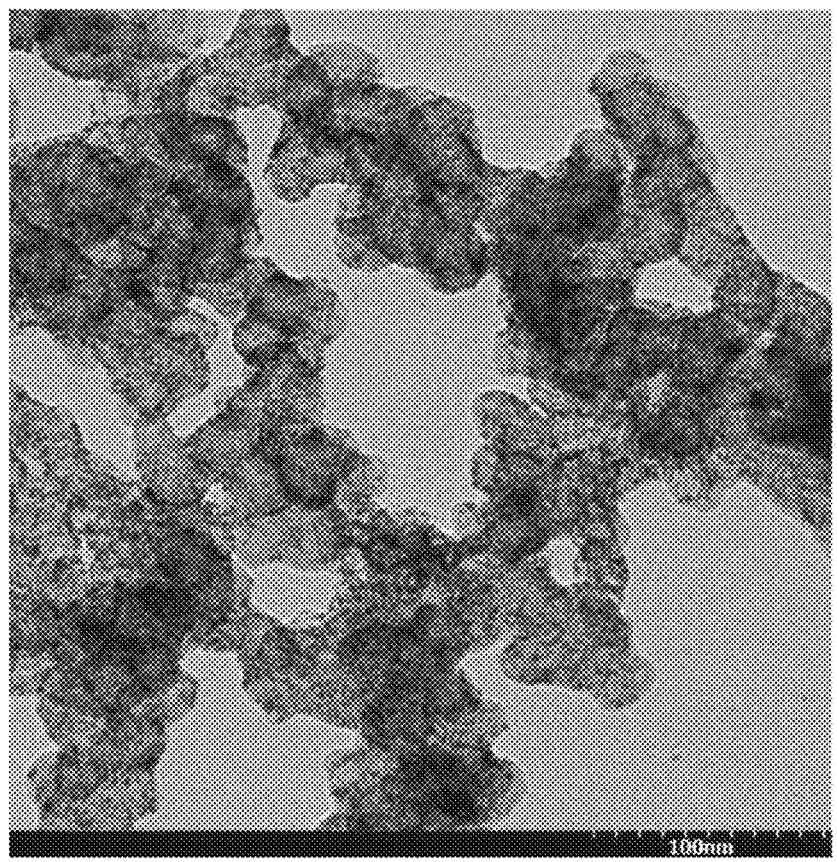

[Figure 12]
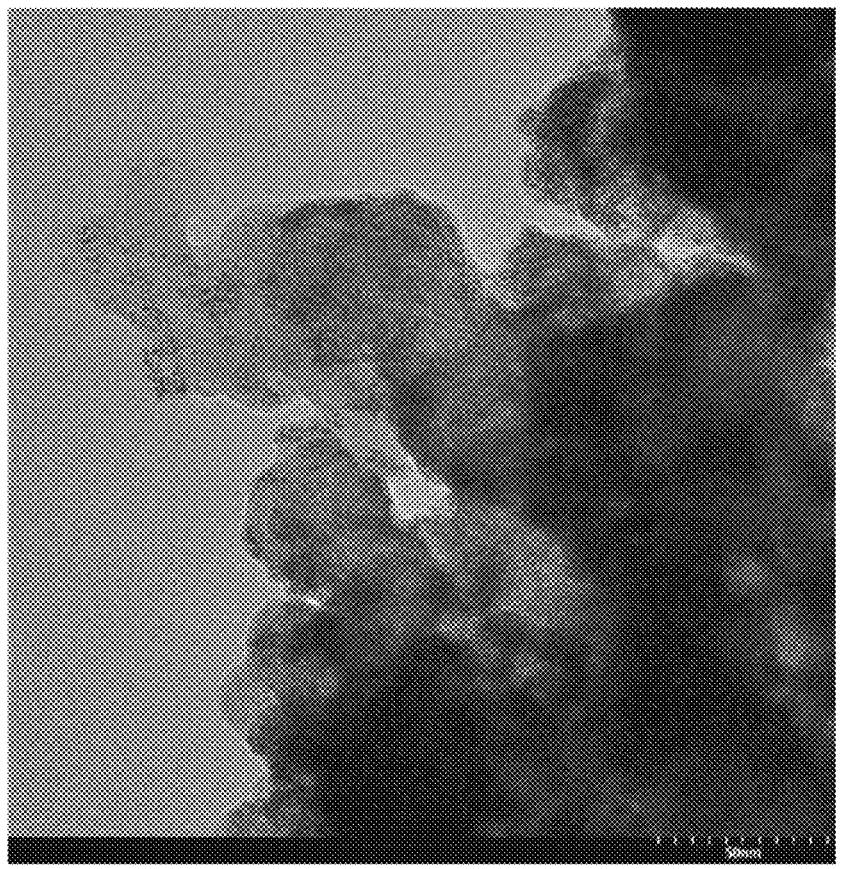

[Figure 13]
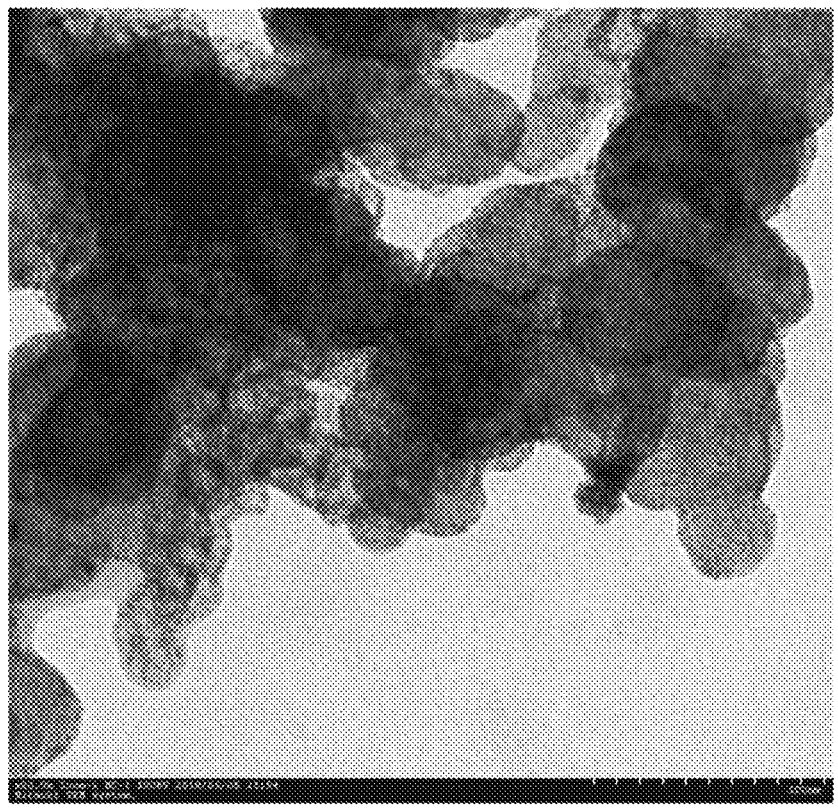

SUPPORT-NANOPARTICLE COMPOSITE, CATALYST CONTAINING SAME, AND FABRICATION METHOD THEREFOR

TECHNICAL FIELD

This application claims priority to and the benefit of Korean Patent Application Nos. 10-2017-0116264 and 10-2018-0079687 filed in the Korean Intellectual Property Office on Sep. 12, 2017 and Jul. 10, 2018, respectively, the entire contents of which are incorporated herein by reference.

The present specification relates to a carrier-nanoparticle complex, a catalyst including the same, an electrochemical cell or a fuel cell including the catalyst, and a method for preparing the same.

BACKGROUND ART

Carbon black is generally used as a support of a fuel cell catalyst. However, when carbon black is used as a support, there occurs a problem with the durability due to the corrosion of carbon.

In order to solve the problem, studies on carbon nanotube (CNT), carbon nanofiber (CNF), carbon nanocage (CNC), and the like, which are crystalline carbon forms having a high corrosion resistance, have been actively conducted. However, these crystalline carbon forms have a problem in that these crystalline carbon forms are not dispersed well in a polar solvent due to the strong surface water repellency thereof. For this reason, there is a problem in that platinum is not uniformly dispersed and agglomerates in the process of loading platinum into a carbon support.

DETAILED DESCRIPTION OF THE INVENTION

Technical Problem

The present specification has been made in an effort to provide a carrier-nanoparticle complex, a catalyst including the same, an electrochemical cell or a fuel cell including the catalyst, and a method for preparing the same.

Technical Solution

The present specification provides a carrier-nanoparticle complex including: a carbon carrier; a polymer layer provided on a surface of the carbon carrier and including a polymer having a pyridine group at a side chain thereof; and metal nanoparticles provided on the polymer layer, in which the polymer having the pyridine group at the side chain thereof includes a repeating unit represented by the following Formula 1.

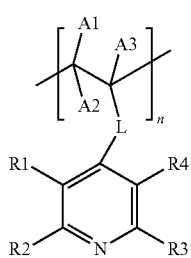

[Formula 1]

In Formula 1,

L is a direct bond or a substituted or unsubstituted alkylene group,

R1 to R4 are the same as or different from each other, and are each independently hydrogen, a halogen group, a hydroxyl group, a nitro group, a nitrile group, or a substituted or unsubstituted alkyl group, A1 to A3 are the same as or different from each other, and are each independently hydrogen, a halogen group, a hydroxyl group, a nitro group, a nitrile group, or a substituted or unsubstituted alkyl group, and n is an integer from 3 to 200.

Further, the present specification provides a catalyst including the above-described carrier-nanoparticle complex.

In addition, the present specification provides an electrochemical cell including the above-described catalyst.

Furthermore, the present specification provides a membrane electrode assembly including: an anode catalyst layer; a cathode catalyst layer; and a polymer electrolyte membrane provided between the anode catalyst layer and the cathode catalyst layer, in which at least one of the anode catalyst layer and the cathode catalyst layer includes the above-described carrier-nanoparticle complex.

Further, the present specification provides a method for preparing a carrier-nanoparticle complex, the method including: forming a polymer layer including a polymer having a pyridine group at a side chain thereof on a carbon carrier; and forming metal nanoparticles on the polymer layer of the carbon carrier by adding the carbon carrier having the polymer layer formed and a metal precursor to a solvent, in which the polymer having the pyridine group at the side chain thereof includes a repeating unit represented by the following Formula 1.

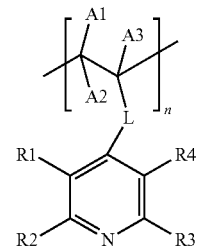

[Formula 1]

In Formula 1,

L is a direct bond or a substituted or unsubstituted alkylene group,

R1 to R4 are the same as or different from each other, and are each independently hydrogen, a halogen group, a hydroxyl group, a nitro group, a nitrile group, or a substituted or unsubstituted alkyl group, A1 to A3 are the same as or different from each other, and are each independently hydrogen, a halogen group, a hydroxyl group, a nitro group, a nitrile group, or a substituted or unsubstituted alkyl group, and n is an integer from 3 to 200.

Advantageous Effects

A carrier-nanoparticle complex according to an exemplary embodiment of the present specification has an advantage in that the dispersibility of metal nanoparticles is excellent.

A carrier-nanoparticle complex according to an exemplary embodiment of the present specification has an advantage in that the amount of metal nanoparticles supported is large.

BRIEF DESCRIPTION OF DRAWINGS

FIG. 1 is a schematic view illustrating an electricity generation principle of a fuel cell.

FIG. 2 is a view schematically illustrating a structure of a membrane electrode assembly for a fuel cell.

FIG. 3 is a view schematically illustrating an example of a fuel cell.

FIG. 4 is an image of the carrier-nanoparticle complex prepared in Example 1 measured by a transmission electron microscope.

FIG. 5 is an image of the carrier-nanoparticle complex prepared in Example 2 measured by a transmission electron microscope.

FIG. 6 is an image of the carrier-nanoparticle complex prepared in Example 3 measured by a transmission electron microscope.

FIG. 7 is an image of the carrier-nanoparticle complex prepared in Example 4 measured by a transmission electron microscope.

FIG. 8 is an image of the carrier-nanoparticle complex prepared in Example 5 measured by a transmission electron microscope.

FIG. 9 is an image of the carrier-nanoparticle complex prepared in Comparative Example 1 measured by a transmission electron microscope.

FIG. 10 is an image of the carrier-nanoparticle complex prepared in Comparative Example 2 measured by a transmission electron microscope.

FIG. 11 is an image of the carrier-nanoparticle complex prepared in Comparative Example 3 measured by a transmission electron microscope.

FIG. 12 is an image of the carrier-nanoparticle complex prepared in Comparative Example 4 measured by a transmission electron microscope.

FIG. 13 is an image of the carrier-nanoparticle complex prepared in Comparative Example 5 measured by a transmission electron microscope.

EXPLANATION OF REFERENCE NUMERALS AND SYMBOLS

10: Electrolyte membrane
20, 21: Catalyst layer
40, 41: Gas diffusion layer
50: Cathode
51: Anode
60: Stack
70: Oxidizing agent supplying part
80: Fuel supplying part
81: Fuel tank
82: Pump

BEST MODE

Hereinafter, the present specification will be described in detail.

The present specification provides a carrier-nanoparticle complex including: a carbon carrier; a polymer layer provided on a surface of the carbon carrier and including a polymer having a pyridine group at a side chain thereof; and metal nanoparticles provided on the polymer layer, in which the polymer having the pyridine group at the side chain thereof includes a repeating unit represented by the following Formula 1.

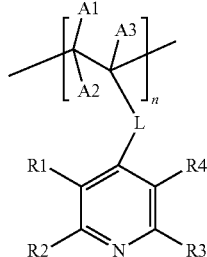

[Formula 1]

In Formula 1,

L is the direct bond or a substituted or unsubstituted alkylene group,

R1 to R4 are the same as or different from each other, and are each independently hydrogen, a halogen group, a hydroxyl group, a nitro group, a nitrile group, or a substituted or unsubstituted alkyl group, A1 to A3 are the same as or different from each other, and are each independently hydrogen, a halogen group, a hydroxyl group, a nitro group, a nitrile group, or a substituted or unsubstituted alkyl group, and n is an integer from 3 to 200.

The carbon carrier is not particularly limited as long as the carbon carrier is a carrier including carbon as a main component, and may include one or more selected from the group consisting of carbon black, carbon nanotube (CNT), graphite, graphene, activated carbon, mesoporous carbon, carbon fiber, and carbon nano wire.

A portion or the entirety of the surface of the carbon carrier may be provided with a polymer layer. 50% to 100% of the surface of the carbon carrier may be provided with a polymer layer, and specifically, 75% to 100% thereof may be provided with a polymer layer.

The carbon carrier may be a crystalline carbon carrier. Specifically, the carbon carrier may be a crystalline carbon carrier that undergoes no pretreatment, an acid-treated crystalline carbon carrier, or a base-treated crystalline carbon carrier.

The crystalline carbon carrier means a carbon in which a peak near 2theta (2θ) of 26° has a full width at half maximum of 2.0 or less in a graph measured by an X-ray diffraction spectroscopy (XRD).

The crystalline carbon carrier may be a carrier having a crystallinity increased by heat-treating carbon black at a high temperature of 1,000° C. or more, and may include one or more selected from the group consisting of carbon nanotube (CNT), graphite, graphene, carbon fiber, and carbon nano wire.

When the crystalline carbon carrier is treated with an acid or a base, it is possible to produce characteristics of imparting defects or functional groups to the surface of carbon.

The polymer layer is provided on the surface of a carbon carrier and includes a polymer having a pyridine group at a side chain thereof.

Examples of the substituents in the present specification will be described below, but are not limited thereto.

In the present specification, the term "substituted or unsubstituted" means being unsubstituted or substituted with one or more substituents selected from the group consisting of deuterium; a halogen group; a nitrile group; a nitro group; a hydroxyl group; a carbonyl group; an ester group; an imide group; an amine group; a phosphine oxide group; an alkoxy group; an aryloxy group; an alkylthioxy group; an arylthioxy group; an alkylsulfoxy group; an arylsulfoxy group; a substituted or unsubstituted silyl group; a boron group; an alkyl group; a cycloalkyl group;

an alkenyl group; an aryl group; an aralkyl group; an aralkenyl group; an alkylaryl group; an alkylamine group; an aralkylamine group; a heteroarylamine group; an arylamine group; an arylphosphine group; and a heterocyclic group, or being unsubstituted or substituted with a substituent to which two or more substituents are linked among the substituents exemplified above. For example, "the substituent to which two or more substituents are linked" may be a biphenyl group. That is, the biphenyl group may also be an aryl group, and may be interpreted as a substituent to which two phenyl groups are linked.

In the present specification, examples of a halogen group include fluorine, chlorine, bromine or iodine.

In the present specification, the alkyl group may be straight-chained or branched, and the number of carbon atoms thereof is not particularly limited, but is preferably 1 to 40. According to an exemplary embodiment, the number of carbon atoms of the alkyl group is 1 to 20. According to another exemplary embodiment, the number of carbon atoms of the alkyl group is 1 to 10. According to still another exemplary embodiment, the number of carbon atoms of the alkyl group is 1 to 6. Specific examples of the alkyl group include methyl, ethyl, propyl, n-propyl, isopropyl, butyl, n-butyl, isobutyl, tert-butyl, sec-butyl, 1-methyl-butyl, 1-ethyl-butyl, pentyl, n-pentyl, isopentyl, neopentyl, tert-pentyl, hexyl, n-hexyl, 1-methylpentyl, 2-methylpentyl, 4-methyl-2-pentyl, 3,3-dimethylbutyl, 2-ethylbutyl, heptyl, n-heptyl, 1-methylhexyl, cyclopentylmethyl, cyclohexylmethyl, octyl, n-octyl, tert-octyl, 1-methylheptyl, 2-ethylhexyl, 2-propylpentyl, n-nonyl, 2,2-dimethylheptyl, 1-ethyl-propyl, 1,1-dimethyl-propyl, isohexyl, 4-methylhexyl, 5-methylhexyl, and the like, but are not limited thereto.

In the present specification, the alkenyl group may be straight-chained or branched, and the number of carbon atoms thereof is not particularly limited, but is preferably 2 to 40. According to an exemplary embodiment, the number of carbon atoms of the alkenyl group is 2 to 20. According to another exemplary embodiment, the number of carbon atoms of the alkenyl group is 2 to 10. According to still another exemplary embodiment, the number of carbon atoms of the alkenyl group is 2 to 6. Specific examples thereof include vinyl, 1-propenyl, isopropenyl, 1-butenyl, 2-butenyl, 3-butenyl, 1-pentenyl, 2-pentenyl, 3-pentenyl, 3-methyl-1-butenyl, 1,3-butadienyl, allyl, 1-phenylvinyl-1-yl, 2-phenylvinyl-1-yl, 2,2-diphenylvinyl-1-yl, 2-phenyl-2-(naphthyl-1-yl)vinyl-1-yl, 2,2-bis(diphenyl-1-yl)vinyl-1-yl, a stilbenyl group, a styrenyl group, and the like, but are not limited thereto.

According to an exemplary embodiment of the present specification, L may be a direct bond.

According to an exemplary embodiment of the present specification, L may be a substituted or unsubstituted alkylene group.

According to an exemplary embodiment of the present specification, A1 to A3 are the same as or different from each other, and are each independently hydrogen or a substituted or unsubstituted alkyl group.

According to an exemplary embodiment of the present specification, A1 to A3 may be hydrogen.

According to an exemplary embodiment of the present specification, A1 to A3 are the same as or different from each other, and are each independently an alkyl group.

According to an exemplary embodiment of the present specification, the repeating unit represented by Formula 1 may be a repeating unit represented by the following Formula 2.

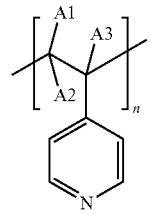

[Formula 2]

In Formula 2, A1 to A3, L, and n are the same as the definitions of Formula 1.

According to an exemplary embodiment of the present specification, the repeating unit represented by Formula 1 may be a repeating unit represented by the following Formula 3.

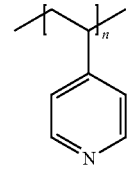

[Formula 3]

In Formula 3, n is the same as the definition of Formula 1.

A weight average molecular weight of the polymer is greater than or equal to 500 g/mol and less than or equal to 1,000,000 g/mol.

The metal nanoparticles may be bonded to a nitrogen element of the pyridine group of the polymer layer.

When the metal nanoparticles are supported, the nitrogen element of the pyridine group of the polymer layer serves as a location where the metal nanoparticles can anchor, thereby contributing to the enhancement of stability and dispersibility of the metal nanoparticles by the pyridine group of the polymer layer.

The metal nanoparticle may include one or two or more metals selected from the group consisting of platinum (Pt), ruthenium (Ru), rhodium (Rh), molybdenum (Mo), osmium (Os), iridium (Ir), rhenium (Re), palladium (Pd), vanadium (V), tungsten (W), cobalt (Co), iron (Fe), selenium (Se), nickel (Ni), bismuth (Bi), tin (Sn), chromium (Cr), titanium (Ti), gold (Au), cerium (Ce), silver (Ag), and copper (Cu). Specifically, the metal nanoparticle may include: platinum (Pt); and a platinum alloy in which iron (Fe), cobalt (Co), nickel (Ni), palladium (Pd), rhodium (Rh), or ruthenium (Ru) is alloyed with platinum (Pt).

The metal nanoparticles may have an average particle diameter of 2 nm to 20 nm, and specifically, 3 nm to 10 nm. In this case, there is an advantage in that the catalyst efficiency is high because metal nanoparticles are not aggregated with each other and are dispersed well on a carbon carrier.

Here, the average particle diameter of the metal nanoparticles means an average of the lengths of the longest lines among lines connecting two points on the surface of the metal nanoparticle, and may mean, for example, an average of the lengths of the longest lines among lines connecting two points on the surface of the metal nanoparticle in an image measured by a transmission electron microscope.

The metal nanoparticle may have a spherical shape. In the present specification, the spherical shape does not mean only a perfect spherical shape, and may include a roughly spherical shape. For example, in the metal nanoparticle, the outer surface having a spherical shape may not be flat, and the radius of curvature in one metal nanoparticle may not be constant.

The metal nanoparticle may be selected from a solid particle including one metal, a solid particle including two or more metals, a core-shell particle including two or more metals, a hollow metal particle including one or two or more metals, a bowl-type particle including one or two or more metals, a yolk-shell particle including two or more metals, a porous particle including one or two or more metals, and the like.

The content of the metal nanoparticles may be 20 wt % to 70 wt % based on the total weight of the carrier-nanoparticle complex. Specifically, the content of the metal nanoparticles may be 30 wt % to 60 wt % based on the total weight of the carrier-nanoparticle complex.

The present specification provides a catalyst including the carrier-nanoparticle complex.

The present specification provides an electrochemical cell including the catalyst.

The electrochemical cell means a cell which uses chemical reactions, and is not particularly limited in type as long as the cell includes an electrolyte membrane, but for example, the electrochemical cell may be a fuel cell, a metal secondary cell, or a flow cell.

The present specification provides an electrochemical cell module including the electrochemical cell as a unit cell.

The electrochemical cell module may be formed by inserting a bipolar plate between flow cells according to one exemplary embodiment of the present application to stack the flow cells.

The cell module may be specifically used as a power source for an electric vehicle, a hybrid electric vehicle, a plug-in hybrid electric vehicle, or a power storage device.

The present specification provides a membrane electrode assembly including: an anode catalyst layer; a cathode catalyst layer; and a polymer electrolyte membrane provided between the anode catalyst layer and the cathode catalyst layer, in which at least one of the anode catalyst layer and the cathode catalyst layer includes the carrier-nanoparticle complex.

The membrane electrode assembly may further include an anode gas diffusion layer provided on a surface opposite to a surface of the anode catalyst layer on which the polymer electrolyte membrane is provided and a cathode gas diffusion layer provided on a surface opposite to a surface of the cathode catalyst layer on which the polymer electrolyte membrane is provided.

The present specification provides a fuel cell including the membrane electrode assembly.

FIG. 1 schematically illustrates an electricity generation principle of a fuel cell, and in a fuel cell, the most fundamental unit of generating electricity is a membrane electrode assembly (MEA), and the membrane electrode assembly is composed of an electrolyte membrane (M), and an anode (A) and a cathode (C) formed on both surfaces of the electrolyte membrane (M). Referring to FIG. 1 which illustrates an elasticity generation principle of a fuel cell, an oxidation reaction of fuel (F) such as hydrogen or a hydrocarbon such as methanol and butane occurs in the anode (A), and as a result, hydrogen ions ($H^+$) and electrons ($e^-$) are generated, and the hydrogen ions move to the cathode (C) through the electrolyte membrane (M). In the cathode (C), the hydrogen ions transferred through the electrolyte membrane (M), an oxidizing agent (O) such as oxygen, and electrons are reacted to produce water (W). Electrons move to an external circuit by the reaction.

FIG. 2 schematically illustrates a structure of a membrane electrode assembly for a fuel cell, and the membrane electrode assembly for the fuel cell may include an electrolyte membrane 10, and a cathode 50 and an anode facing each other with the electrolyte membrane 10 interposed therebetween. In the cathode, a cathode catalyst layer 20 and a cathode gas diffusion layer 40 may be provided sequentially from the electrolyte membrane 10, and in the anode, an anode catalyst layer 21 and an anode gas diffusion layer 41 may be provided sequentially from the electrolyte membrane 10.

The catalyst according to the present specification may be included in at least one of a cathode catalyst layer and an anode catalyst layer in a membrane electrode assembly.

FIG. 3 schematically illustrates a structure of a fuel cell, and the fuel cell includes a stack 60, an oxidizing agent supplying part 70, and a fuel supplying part 80.

The stack 60 includes the one membrane electrode assembly or two or more membrane electrode assemblies, and when two or more membrane electrode assemblies are included, the stack 60 includes a separator interposed therebetween. The separator serves to prevent the membrane electrode assemblies from being electrically connected to each other, and to transfer fuel and an oxidizing agent, which are supplied from the outside, to the membrane electrode assemblies.

The oxidizing agent supplying part 70 serves to supply an oxidizing agent to the stack 60. As the oxidizing agent, oxygen is representatively used, and oxygen or air may be used by being injected into the oxidizing agent supplying part 70.

The fuel supplying part 80 serves to supply fuel to the stack 60, and may be composed of a fuel tank 81 which stores fuel, and a pump 82 which supplies the stack 60 with fuel stored in the fuel tank 81. As the fuel, hydrogen or hydrocarbon fuel in a gas or liquid state may be used. Examples of the hydrocarbon fuel may include methanol, ethanol, propanol, butanol, or natural gases.

At least one of the anode catalyst layer and the cathode catalyst layer may include the carrier-nanoparticle complex according to the present specification as a catalyst.

The anode catalyst layer and the cathode catalyst layer may each include an ionomer.

When the anode catalyst layer includes the carrier-nanoparticle complex, the ratio of the ionomer of the anode catalyst layer to the carrier-nanoparticle complex (ionomer/complex, I/C) is 0.3 to 0.7.

When the cathode catalyst layer includes the carrier-nanoparticle complex, the ratio of the ionomer of the cathode catalyst layer to the carrier-nanoparticle complex (ionomer/complex, I/C) is 0.3 to 0.7.

In general, considering that the I/C ratio used in a commercially available catalyst is 0.8 to 1 (Book "PEM Fuel Cell Electrocatalyst and Catalyst Layer", page 895), when the carrier-nanoparticle complex according to the present specification is included as a catalyst, the content of the catalyst may be reduced by 20 wt % or more based on the content of the ionomer required for the catalyst layer, specifically 30 wt % or more, and more specifically 50 wt % or more. In other words, there is an advantage in that the content of the expensive ionomer may be reduced, and predetermined or more hydrogen ion conductivity may be maintained even with a small ionomer content.

The ionomer serves to provide a channel through which ions produced by a reaction between fuel such as hydrogen or methanol and a catalyst move to an electrolyte membrane.

The ionomer may use a polymer having a cation exchange group selected from the group consisting of a sulfonic acid group, a carboxylic acid group, a phosphoric acid group, a phosphonic acid group, and a derivative thereof at the side chain thereof. Specifically, the ionomer may include one or more hydrogen ion conductive polymers selected from a fluoro-based polymer, a benzimidazole-based polymer, a polyimide-based polymer, a polyetherimide-based polymer, a polyphenylenesulfide-based polymer, a polysulfone-based polymer, a polyethersulfone-based polymer, a polyetherketone-based polymer, a polyether-etherketone-based polymer, or a polyphenylquinoxaline-based polymer. Specifically, according to an exemplary embodiment of the present specification, the polymer ionomer may be Nafion.

The present specification provides a method for preparing a carrier-nanoparticle complex, the method including: forming a polymer layer including a polymer having a pyridine group at a side chain thereof on a carbon carrier; and forming metal nanoparticles on the polymer layer of the carbon carrier by adding the carbon carrier having the polymer layer formed and a metal precursor to a solvent, in which the polymer having the pyridine group at the side chain thereof includes a repeating unit represented by the following Formula 1.

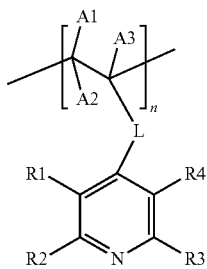

[Formula 1]

In Formula 1,

L is a direct bond or a substituted or unsubstituted alkylene group,

R1 to R4 are the same as or different from each other, and are each independently hydrogen, a halogen group, a hydroxyl group, a nitro group, a nitrile group, or a substituted or unsubstituted alkyl group, A1 to A3 are the same as or different from each other, and are each independently hydrogen, a halogen group, a hydroxyl group, a nitro group, a nitrile group, or a substituted or unsubstituted alkyl group, and n is an integer from 3 to 200.

For the method for preparing the carrier-nanoparticle complex, it is possible to cite those described above for the carrier-nanoparticle complex.

In the forming of the polymer layer, a polymer layer including a polymer having a pyridine group at a side chain thereof is formed on a carbon carrier.

The forming of the polymer layer may include: preparing a first solution including a carbon carrier, a polymer having a pyridine group at a side chain thereof, and a first solvent; and forming a polymer layer including a polymer having a pyridine group at a side chain thereof in the carbon carrier by stirring the first solution.

In the first solution, the first solvent is not particularly limited as long as the first solvent can dissolve a polymer having a pyridine group at a side chain thereof. For example, the solvent may be: an aqueous solution including at least one of nitric acid, sulfuric acid, and hydrochloric acid; an alcohol such as methanol, ethanol, propanol, and isopropanol; or dimethylformamide.

In the first solution, when an aqueous solution including at least one of nitric acid, sulfuric acid, and hydrochloric acid is used as the first solvent, potassium nitrate ($KNO_3$) may be further added to the first solution.

Based on the solid content weight of the first solution, the content of the carbon carrier may be 10 wt % to 90 wt %.

Based on the solid content weight of the first solution, the content of the polymer having the pyridine group at the side chain thereof may be 10 wt % to 90 wt %.

Based on the total weight of the first solution, the total content of the solid content of the first solution except for the first solvent may be 0.05 wt % to 20 wt %, and based on the total weight of the first solution, the content of the first solvent may be 80 wt % to 99.95 wt %.

The time for which the first solution is stirred may be 3 hours to 72 hours.

The carbon carrier may be a crystalline carbon carrier. In the forming of the polymer layer, a crystalline carbon carrier as a carbon carrier may be used without any pretreatment.

When a crystalline carbon carrier is used as the carbon carrier, the method for preparing a carrier-nanoparticle complex may further include treating the crystalline carbon carrier with an acid or a base before the forming of the polymer layer.

In the forming of the metal nanoparticles, metal nanoparticles are formed on the polymer layer of the carbon carrier by adding the carbon carrier having the polymer layer formed and a metal precursor to a solvent.

The forming of the metal nanoparticles may include: preparing a second solution including a carbon carrier having a polymer layer formed, a metal precursor, and a second solvent; stirring the second solution; and forming metal nanoparticles by reducing the metal precursor.

The metal precursor is a material before being reduced to metal nanoparticles, and the metal precursor may be selected according to the type of metal nanoparticle.

The type of metal precursor is not limited, but the metal precursor is a salt including a metal ion or an atomic group ion including the metal ion, and may serve to provide a metal.

According to the metal component of metal nanoparticles to be prepared, the metal precursor may include one or more metal precursors having metal ions or atomic group ions different from each other.

The solvent of the second solution may include water or a polyhydric alcohol having two or more hydroxyl groups. The polyhydric alcohol is not particularly limited as long as the polyhydric alcohol has two or more hydroxyl groups, but may include at least one of ethylene glycol, diethylene glycol, and propylene glycol.

The second solution for forming metal nanoparticles on the polymer layer of the carbon carrier does not include a surfactant. In this case, there are advantages in that a step of removing a surfactant after synthesizing a catalyst is not necessary, and there is no reduction in active site caused by a surfactant.

When a polyhydric alcohol is used as the solvent of the second solution, the second solution may further include a basic compound such as sodium hydroxide, potassium hydroxide, calcium hydroxide, and lithium hydroxide. In this case, there is an advantage in that the particle diameter of the metal nanoparticle is decreased. Specifically, when a polyhydric alcohol is used as a solvent of a second solution, particles having a smaller size are produced without being aggregated due to the electrostatic repulsive force as the concentration of OH— in the solution is increased.

Based on the total weight of the second solution, the content of the carbon carrier having the polymer layer formed may be 0.01 wt % to 3 wt.

Based on the total weight of the second solution, the content of the metal precursor may be 0.01 wt % to 4 wt %.

Based on the total weight of the second solution, the content of the second solvent may be 93 wt % to 99 wt %.

The method for preparing the carrier-nanoparticle complex may further include forming metal nanoparticles on a polymer layer of a carbon carrier, and then removing a solvent.

The removing of the solvent may be drying a carrier-nanoparticle complex by removing the solvent.

The method for preparing a carrier-nanoparticle complex may further include heat-treating or acid-treating the metal nanoparticles after the forming of the metal nanoparticles.

When the metal nanoparticles are heat-treated, the metal nanoparticles provided on the polymer layer of the carbon carrier may be sintered.

The heat-treating of the metal nanoparticles may include heat-treating the metal nanoparticles under a hydrogen or argon atmosphere. In this case, the heat treatment temperature may be 180° C. to 600° C. In this case, there is an advantage in that the supported metal nanoparticles may be sintered by the heat treatment without being aggregated while minimizing a chemical modification of the polymer layer.

When the metal nanoparticles are acid-treated, it is possible to impart new surface characteristics to the carrier and the metal nanoparticles supported on the carrier or reinforce inherent surface characteristics due to the surface modification of catalyst particles and the carrier.

During the acid treatment, the acid treatment solution may be sulfuric acid, hydrochloric acid, nitric acid, or the like at a concentration of 1 M or less.

During the acid treatment, the acid treatment temperature may be 80° C. or less, and may be specifically room temperature to 80° C.

During the acid treatment, the acid treatment time may be 30 minutes to 5 hours.

Hereinafter, the present specification will be described in more detail through Examples. However, the following Examples are provided only for exemplifying the present specification, but are not intended to limit the present specification.

Mode for Invention

EXAMPLES

Example 1

3 g of poly(4-vinyl pyridine) (P4VP) and 60 ml of 1 M hydrochloric acid (HCl) were added to 1 L of water and dissolved while being sufficiently stirred. Thereafter, 6 g of $KNO_3$ was additionally dissolved, and then 1.8 g of Vulcan XC-72R (carbon black manufactured by Cabot Chemicals, Inc., a non-crystalline particle, BET value: 250 $m^2$/g, and full width at half maximum: 3.817) was dispersed. After the solution was stirred at room temperature for 24 hours, the resulting product was washed with distilled water and dried to prepare Vulcan XC-72R coated with P4VP.

65 mg of the Vulcan XC-72R coated with P4VP was dispersed in 25 ml of ethylene glycol, and then 74.1 mg of $PtCl_4$ and 50 mg of sodium hydroxide were added thereto. In this case, the molar ratio of a hydroxyl group ($OH^-$) dissociated from sodium hydroxide:Pt of $PtCl_4$ was 5.7:1.

After reaction at 160° C. for 3 hours, the resulting product was washed with ethanol and water. In this case, the product was reduced by the solvent ethylene glycol, and the supported particles were platinum solid particles.

Example 2

3 g of poly(4-vinyl pyridine) (P4VP) and 60 ml of 1 M hydrochloric acid (HCl) were added to 1 L of water and dissolved while being sufficiently stirred. Thereafter, 6 g of $KNO_3$ was additionally dissolved, and then 1.8 g of Denka black (acetylene black manufactured by Denka Co., Ltd., non-crystalline particle, BET value: 70 $m^2$/g) was dispersed. After the solution was stirred at room temperature for 24 hours, the resulting product was washed with distilled water and dried to prepare Denka black coated with P4VP.

65 mg of the Denka black coated with P4VP was dispersed in 25 ml of ethylene glycol, and then 74.1 mg of $PtCl_4$ and 50 mg of sodium hydroxide were added thereto. After reaction at 160° C. for 3 hours, the resulting product was washed with ethanol and water. In this case, the product was reduced by the solvent ethylene glycol, and the supported particles were platinum solid particles.

Example 3

3 g of poly(4-vinyl pyridine) (P4VP) and 60 ml of 1 M hydrochloric acid (HCl) were added to 1 L of water and dissolved while being sufficiently stirred. Thereafter, 6 g of $KNO_3$ was additionally dissolved, and then 1.8 g of #3855 (graphitized carbon black manufactured by Tokai Carbon Co., Ltd., crystalline particle, BET value: 90 $m^2$/g, and full width at half maximum: 1.754) was dispersed. After the solution was stirred at room temperature for 24 hours, the resulting product was washed with distilled water and dried to prepare #3855 coated with P4VP.

65 mg of the #3855 coated with P4VP was dispersed in 25 ml of ethylene glycol, and then 74.1 mg of $PtCl_4$ and 50 mg of sodium hydroxide were added thereto. After reaction at 160° C. for 3 hours, the resulting product was washed with ethanol and water. In this case, the product was reduced by the solvent ethylene glycol, and the supported particles were platinum solid particles.

Example 4

3 g of poly(4-vinyl pyridine) (P4VP) and 60 ml of 1 M hydrochloric acid (HCl) were added to 1 L of water and dissolved while being sufficiently stirred. Thereafter, 6 g of $KNO_3$ was additionally dissolved, and then 1.8 g of FX100 (highly crystalline carbon manufactured by Cabot Chemicals, Inc., crystalline particle, BET value: 90 $m^2$/g, and full width at half maximum: 1.754) was dispersed. After the solution was stirred at room temperature for 24 hours, the resulting product was washed with distilled water and dried to prepare FX100 coated with P4VP.

65 mg of the FX100 coated with P4VP was dispersed in 25 ml of ethylene glycol, and then 74.1 mg of $PtCl_4$ and 50 mg of sodium hydroxide were added thereto. After reaction at 160° C. for 3 hours, the resulting product was washed with ethanol and water. In this case, the product was reduced by the solvent ethylene glycol, and the supported particles were platinum solid particles.

Example 5

After 4 g of FX100 was administered to 1.25 L of 1.6 M NaOH, ultrasonic treatment and stirring were sufficiently performed, and then base-treated FX100 was prepared by recovering the resulting product with centrifugation.

3 g of poly(4-vinyl pyridine) (P4VP) and 60 ml of 1 M hydrochloric acid (HCl) were added to 1 L of water and dissolved while being sufficiently stirred. Thereafter, 6 g of $KNO_3$ was additionally dissolved, and then 1.8 g of the base-treated FX100 was dissolved. After the solution was stirred at room temperature for 24 hours, the resulting product was washed with distilled water and dried to prepare a carrier in which the surface of the base-treated FX100 was coated with P4VP.

65 mg of the base-treated FX100 coated with P4VP was dispersed in 25 ml of ethylene glycol, and then 74.1 mg of $PtCl_4$ and 50 mg of sodium hydroxide were added thereto. After reaction at 160° C. for 3 hours, the resulting product was washed with ethanol and water. In this case, the product was reduced by the solvent ethylene glycol, and the supported particles were platinum solid particles.

Comparative Example 1

Metal particles were supported directly on Denka black in the same manner as in Example 2, except that the surface of the Denka black was not coated with P4VP.

Comparative Example 2

Metal particles were supported directly on #3855 in the same manner as in Example 3, except that the surface of the #3855 was not coated with P4VP.

Comparative Example 3

Metal particles were supported directly on FX100 in the same manner as in Example 4, except that the surface of the FX100 was not coated with P4VP.

Comparative Example 4

250 mg of poly(2,5 pyridine) and 5 ml of 1 M hydrochloric acid (HCl) were added to 85 mL of water and dissolved while being sufficiently stirred. Thereafter, 500 mg of $KNO_3$ was additionally dissolved, and then 150 mg of FX100 was dissolved. After the solution was stirred at room temperature for 24 hours, the resulting product was washed with distilled water and dried to prepare FX100 coated with polypyridine.

65 mg of the FX100 coated with polypyridine was dispersed in 25 ml of ethylene glycol, and then 74.1 mg of $PtCl_4$ and 50 mg of sodium hydroxide were added thereto. After reaction at 160° C. for 3 hours, the resulting product was washed with ethanol and water. In this case, the product was reduced by the solvent ethylene glycol, and the supported particles were platinum solid particles.

Comparative Example 5

1 g of poly(2-vinyl pyridine) (P2VP) and 20 ml of 1 M hydrochloric acid (HCl) were added to 330 mL of water and dissolved while being sufficiently stirred. Thereafter, 2 g of $KNO_3$ was additionally dissolved, and then 600 mg of FX100 was dissolved. After the solution was stirred at room temperature for 24 hours, the resulting product was washed with distilled water and dried to prepare FX100 coated with P2VP.

65 mg of the FX100 coated with P2VP was dispersed in 25 ml of ethylene glycol, and then 74.1 mg of $PtCl_4$ and 50 mg of sodium hydroxide were added thereto. After reaction at 160° C. for 3 hours, the resulting product was washed with ethanol and water. In this case, the product was reduced by the solvent ethylene glycol, and the supported particles were platinum solid particles.

Experimental Example 1

Images of the carrier-nanoparticle complexes prepared in Examples 1 to 5 and Comparative Examples 1 to 5 measured by a transmission electron microscope are illustrated in FIGS. 4 to 13, respectively.

Through FIGS. 4 to 13, it could be seen that as a whole, the carriers coated with P4VP in Examples 1 to 5 exhibited uniform supported dispersibility, and an unsupported portion of the carrier was rarely seen.

In the case of a carrier which was not coated with a polymer, an unsupported portion of the carrier was observed, and particularly, in the case of a crystalline carbon, an unsupported portion of the carrier was more frequently observed.

In the case of the carrier coated with polypyridine in Comparative Example 4 and the carrier coated with P2VP in Comparative Example 5, it was observed that the carriers were not uniformly coated, the polymer was present separately from the carrier, and the platinum solid particles were aggregated. These portions may serve as a resistance factor when an electrode is designed afterwards, and metal nanoparticles, which are supported on aggregated polymers spaced apart from the carbon carrier without being coated onto the carbon carrier, cannot exhibit catalytic activity because it is difficult to form an interface with carbon.

Experimental Example 2

The supporting ratios of platinum solid particles supported on the carrier-nanoparticle complexes prepared in Examples 1 to 5 and Comparative Examples 1 to 5 were calculated by the following Equation 1, and are shown in the following Table 1.

Particle supporting ratio (%)=Actual supported amount×100/Target supported amount    [Equation 1]

In this case, the actual supported amount is a content of Pt measured by an ICP analysis, and the target supported amount is a value calculated through the weight of the precursor used as compared to the total weight of the carrier.

TABLE 1

| | Preparation of Carrier | | Synthesis of Catalyst Particle Supported |
|---|---|---|---|
| | Carbon | Polymer Layer | Rate (%) |
| Example 1 | Vulcan XC-72R | P4VP | 84.3 |
| Example 2 | Denka black | P4VP | 77.3 |
| Example 3 | #3855 | P4VP | 75.3 |
| Example 4 | FX100 | P4VP | 75.5 |
| Example 5 | FX100_base | P4VP | 87.8 |
| Comparative Example 1 | Denka black | — | 73.3 |
| Comparative Example 2 | #3855 | — | 39.3 |
| Comparative Example 3 | FX100 | — | 53.2 |
| Comparative Example 4 | FX100 | Polypyridine | 64.8 |
| Comparative Example 5 | FX100 | P2VP | 60.8 |

Through Table 1, it can be seen that the coating effect of P4VP exhibits the highest effect when the coating is applied to highly crystalline carbon such as #3855 and FX100. Further, it was confirmed that Example 5 in which the surface of FX100 was treated with a base exhibited a better effect than Example 4 in which FX100 of which the surface was not treated with a base was used.

The invention claimed is:

1. A carrier-nanoparticle complex in an electrochemical cell or in a fuel cell, comprising:
   a carbon carrier comprising carbon black;
   a polymer layer provided on a surface of the carbon carrier, the polymer layer comprising polymer having a pyridine group at a side chain thereof; and
   metal nanoparticles provided on the polymer layer,
   wherein the polymer having the pyridine group at the side chain thereof comprises poly (4-vinyl pyridine) (P4VP),
   wherein 50% to 100% of a surface of the carbon carrier is provided with the polymer layer,
   wherein the metal nanoparticles comprise platinum,
   wherein the metal nanoparticles have an average particle diameter of 2 nm to 20 nm,
   wherein a content of the metal nanoparticles is 20 wt % to 70 wt % based on a total weight of the carrier-nanoparticle complex,
   wherein BET value of the carbon carrier is 70m$^2$/g to 250m$^2$/g,
   wherein a platinum particle supporting ratio on the carrier-nanoparticle complex is 75.3% to 84.3%, and
   wherein the particle supporting ratio (%) is according to Equation 1:

Particle supporting ratio (%)=Actual supported amount×100/Target supported amount  [Equation 1]

wherein the actual supported amount is a content of Pt measured by an ICP analysis, and the target supported amount is a value calculated through the weight of a precursor used as compared to the total weight of the carrier-nanoparticle complex.

2. The carrier-nanoparticle complex of claim 1, wherein a weight average molecular weight of the polymer is greater than or equal to 500 g/mol and less than or equal to 1,000,000 g/mol.

3. A catalyst comprising the carrier-nanoparticle complex according to claim 1.

4. An electrochemical cell comprising the catalyst of claim 3.

5. A membrane electrode assembly comprising: an anode catalyst layer; a cathode catalyst layer; and a polymer electrolyte membrane provided between the anode catalyst layer and the cathode catalyst layer, wherein at least one of the anode catalyst layer and the cathode catalyst layer comprises the carrier-nanoparticle complex according to claim 1.

6. A method for preparing the carrier-nanoparticle complex according to claim 1, the method comprising:
   forming the polymer layer on the surface of the carbon carrier, the polymer layer comprising polymer having a pyridine group at a side chain thereof; and
   forming the metal nanoparticles on the polymer layer of the carbon carrier by adding the carbon carrier having the polymer layer formed and a metal precursor to a solvent.

7. The method of claim 6, further comprising: heat-treating or acid-treating the metal nanoparticles after the forming of the metal nanoparticles on the polymer layer.

* * * * *